Dec. 11, 1934.  W. A. HAMILTON  1,984,131
AUTOMATIC CLUTCH
Filed May 31, 1933  2 Sheets-Sheet 1
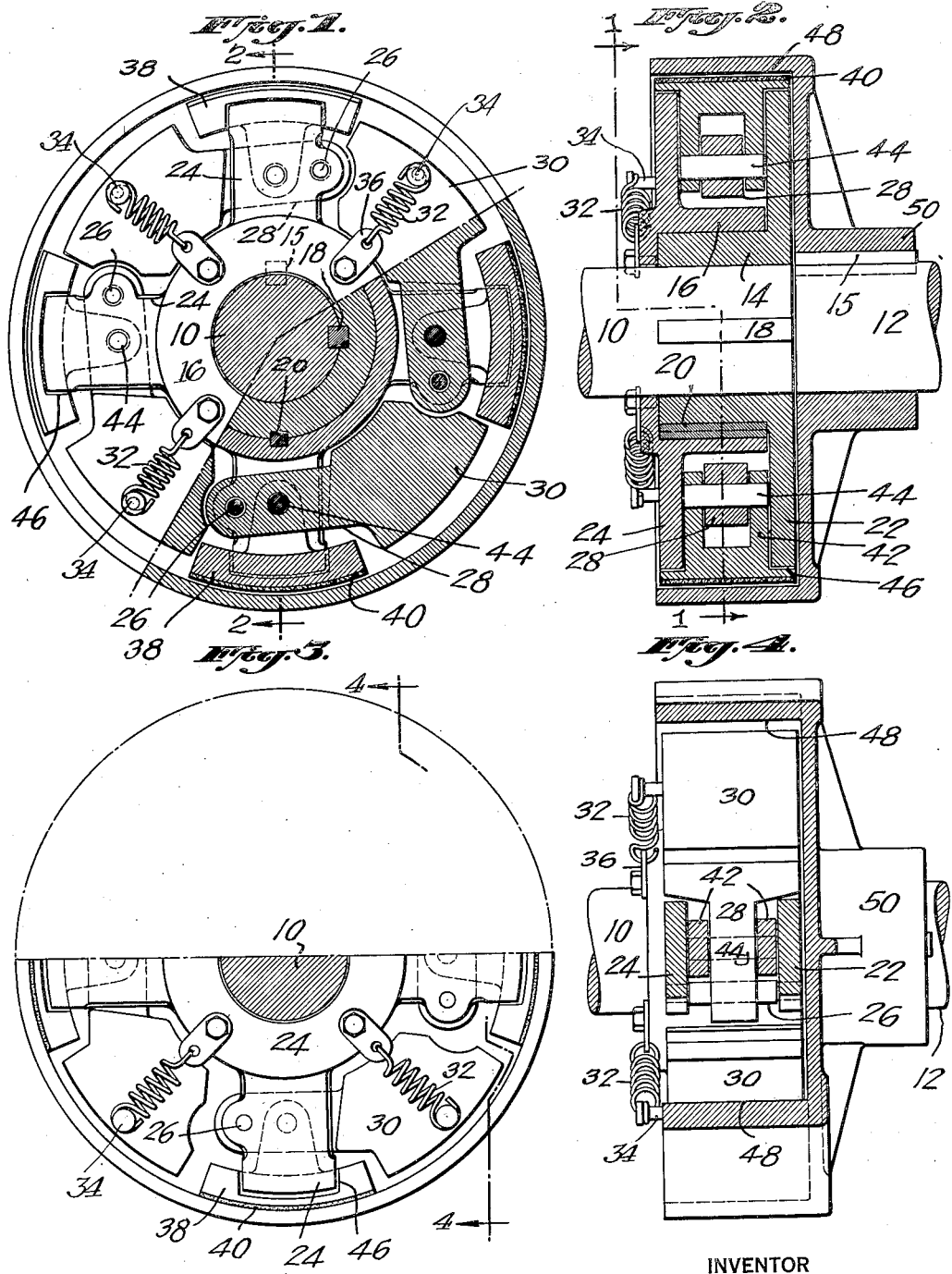
INVENTOR
WILLIAM A. HAMILTON.
BY
Usina & Rauber
ATTORNEYS Dec. 11, 1934.  W. A. HAMILTON  1,984,131
AUTOMATIC CLUTCH
Filed May 31, 1933  2 Sheets-Sheet 2

INVENTOR
WILLIAM A. HAMILTON
BY
ATTORNEYS

Patented Dec. 11, 1934

1,984,131

UNITED STATES PATENT OFFICE 1,984,131

AUTOMATIC CLUTCH

William A. Hamilton, Birmingham, Ala.

Application May 31, 1933, Serial No. 673,780

3 Claims. (Cl. 192—105)

The invention relates to improved features of construction and arrangement hereinafter more specifically disclosed and pointed out with particularity in the appended claims.

The invention will be fully apparent from the accompanying drawings when read in connection with the following detail description and will be defined with particularity in accordance with the provisions of the statutes in the appended claims.

Two alternative embodiments of the invention are illustrated in the accompanying drawings, in which—

Fig. 1 is a face view of the clutch embodying my invention, portions shown in the sector between the dot and dash lines being shown in section, the plane of section being indicated approximately by the section line 1—1 of Fig. 2;

Fig. 2 is a central longitudinal section through the clutch on line 2—2 of Fig. 1;

Fig. 3 is a view similar to Fig. 1 showing the parts in the position that they assume when the clutch is rotating at a relatively high speed;

Fig. 4 is a view taken approximately on the staggered section line 4—4 of Fig. 3;

Figure 5:
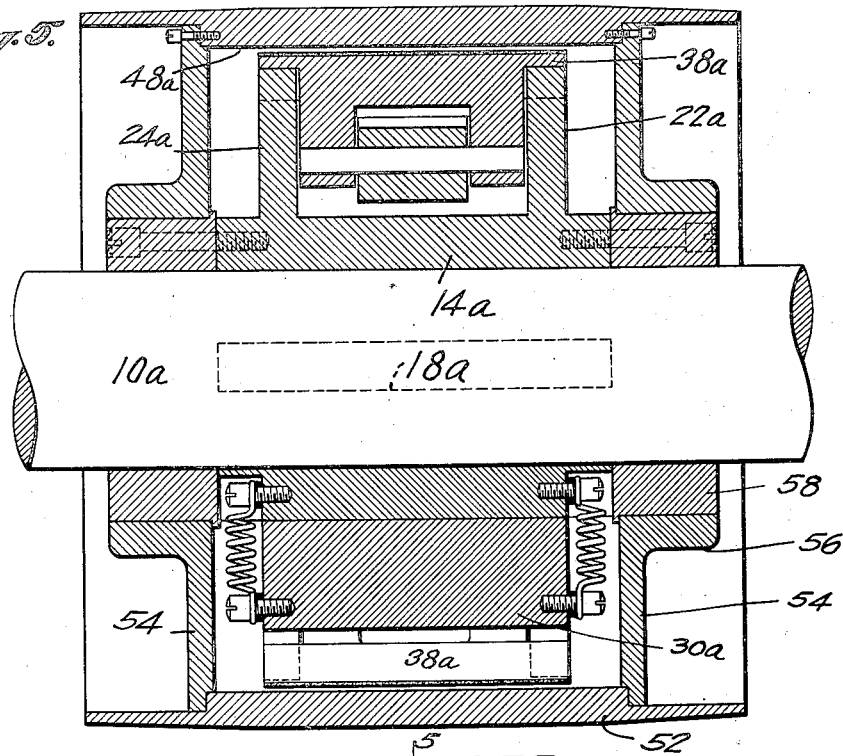
Fig. 5 is a view in longitudinal section on line 5—5 of Fig. 6, illustrating the invention as applied to a pulley.

Referring first to Figs. 1 to 4 inclusive, the device illustrated may be regarded as a shaft coupling comprising a driving shaft 10 and a driven shaft 12 adapted to be operatively connected with one another by the clutch of my invention when the driving shaft 10 reaches a predetermined speed. The driving shaft carries two main driving members 14 and 16, the former being driven by the shaft through a key 18. The members 14 and 16 are keyed together at their hub portions by key 20, hence they both revolve as a unit with the drive shaft. Outwardly extending arms 22 and 24 carried by the members 14 and 16, respectively, carry pins 26 which form pivotal supports for the arms 28 of weight elements 30, which are adapted to be thrown out by centrifugal force against the action of springs 32. The springs, as clearly shown, have hook portions which engage pins 34 carried by the weight members and are anchored to clips 36 secured to the end face of the member 16.

Friction blocks 38, carrying suitable friction linings 40, are provided with bifurcated lugs 42 which straddle the arms 28 of the weighted elements 30 and are pivotally connected thereto by pins 44. The blocks 38 are recessed at 46 for slidable guiding engagement with the outer extremities of the arms 22 and 24, as shown.

The friction blocks are arranged to coact with the inner face of the annular flange 48 of the driven member 50 secured to the driven shaft 12 by key 15.

In operation, when a driving torque is applied to the shaft 10 centrifugal force will gradually throw the weights 30 outwardly against the action of the springs 32. And because of the fact that this centrifugal force is transmitted through a moment arm which measured from the pivotal point 26 to the line of force passing through the center of gravity of the weight 30, is materially greater than the moment arm measured from the fulcrum 26 to the center of the pin 44, it follows that the net effect of the centrifugal force exerted by each weight 30 is materially increased so as to firmly hold each friction block in engagement with the surface 48 of the driven member. And inasmuch as centrifugal force exerted by a revolving member increases in proportion to the speed of rotation, it follows that the higher the speed of the shaft the greater will be the friction grip between the friction blocks and the driven member. The arrangement is such that as the speed of the drive shaft starts from zero and at no load and gradually picks up speed so also will friction between the blocks and the driven member increase, thus there will be a gradual and smooth picking up of the load by the gradually increasing friction between the blocks 38 and the annular flange 48 of the driven member. And when the drive shaft reaches a predetermined maximum speed the centrifugal force acting through the lever arms will exert such a great pressure that there will be no slippage and the driving and driven members will, therefore, both revolve as a unit.

Figure 6:
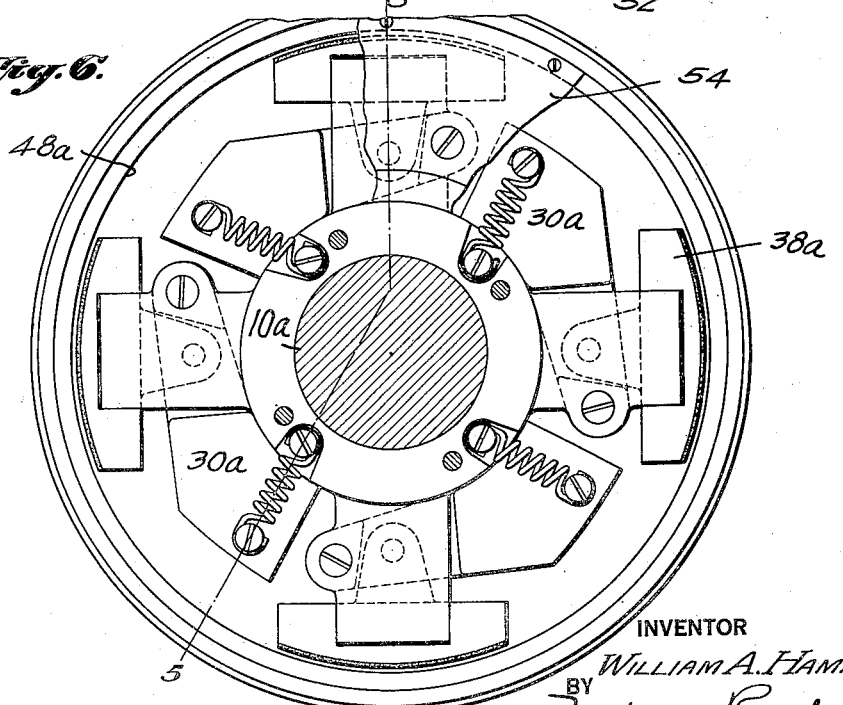
Fig. 6 is a view from the left end of Fig. 5, with one of the end members broken away to reveal the interior parts.

In the modification of Figs. 5 and 6, the invention is embodied in a pulley. In this modification, the pulley rim 52 is a driven member. It is supported by end plates 54 having hubs 56 which are rotatably mounted on collars 58 secured to and movable with a driving member 14$^a$ secured to a drive shaft 10$^a$ and driven through a key 18$^a$. The member 14$^a$ has arms 22$^a$ and 24$^a$ corresponding substantially to the similar parts shown in Figs. 1 to 3 inclusive. These arms pivotally support weight members 30$^a$ which transmit centrifugal force through multiplying lever arms to the friction blocks 38$^a$ coacting with the inner surface 48$^a$ of the pulley rim 52. With such an arrangement, it will be appreciated that upon the application of a torque to the shaft 10ª, when the shaft reaches a predetermined speed centrifugal force acting through the weights 30ª and friction blocks 38ª will gradually and positively apply the driving torque to the pulley. Of course when the speed reaches a desired predetermined number of revolutions per minute it will be understood that there will be no slippage between the friction blocks and the pulley and thus the shaft and the pulley will rotate in unison.

From the foregoing, it will be manifest that in both of the embodiments of the invention illustrated, because of the "mechanical advantage" secured by transmitting centrifugal force through the moment arms of different lengths, I will for a given unit of weight of centrifugal member secure a greater friction grip than would otherwise be possible. This results in a saving of the over-all weight for a clutch to transmit a given torque at a given speed and hence results in a corresponding saving in power due to a lessening of the dead weight carried by the power shaft.

Another advantage, which accrues from the use of my invention, is the ease of changing from one driving source to another driving source in the operation of centrifugal pumps, fans and like rotary devices which are provided with dual drives. For example, if, as in the case of interruption of electric power current, a motor connected to a fan shaft coupling, such as illustrated in Figs. 1 to 4 inclusive, should slow down, the clutch would then automatically and gradually release. It is then but a simple matter for an operator to start an engine at the other end of the fan shaft connected thereto by one of my improved couplings because, when the engine attains the requisite speed, the friction blocks in the coupling will automatically be forced outwardly, as herein described, so as to operatively connect such engine with the fan, hence little or no fan operating time is lost.

While I have described quite specifically the design and arrangement of the embodiments of the invention herein illustrated it is to be understood that various modifications and substitutions of equivalents may be made by those skilled in the art without departing from the invention as defined in the appended claims.

What I claim is:—

1. Clutch mechanism comprising rotary driving and driven members, the driving member having a plurality of pairs of outwardly extending drive arms, friction blocks adapted for coupling the two members, said blocks having pockets slidably engaging the extremities of said arms, weights having portions extending between each pair of arms and pivoted thereto and operatively connected with said friction blocks, the connection between the weights and the blocks being so arranged that the effect of centrifugal force on the weights is transmitted to the blocks with increased magnitude.

2. The clutch mechanism of claim 1, including detachable spring anchorages secured to the drive member and springs coacting therewith and with said weights tending to urge the latter toward the center of rotation of the drive member.

3. Clutch mechanism of the character described comprising a driven member, a rotary drive member including a pair of complementary parts having telescopically engaging hub portions, means preventing relative motion between said parts, respective arms fixedly secured to said hub portions and extending outwardly therefrom, friction blocks having substantially radial inwardly opening guide pockets slidingly engaging the outer extremities of said arms and having inwardly extending lugs straddled by said arms, weights having shanks fulcrumed on said arms and carrying pins constituting floating pivotal supports for said friction blocks.

WILLIAM A. HAMILTON.